United States Patent [19]
Chang

[11] Patent Number: 4,798,053
[45] Date of Patent: Jan. 17, 1989

[54] KINETIC ENERGY RECLAIMING SYSTEM FOR VEHICLE

[76] Inventor: Jimmy C. K. Chang, 215 Powell St., San Francisco, Calif. 94102

[21] Appl. No.: 101,510

[22] Filed: Sep. 28, 1987

Related U.S. Application Data

[63] Continuation-in-part of Ser. No. 940,092, Dec. 10, 1986, abandoned.

[51] Int. Cl.$^4$ .......................... F01B 29/04; B60K 3/00
[52] U.S. Cl. ........................................ 60/712; 60/412; 60/668; 180/302; 180/165; 180/69.6
[58] Field of Search ............................ 60/407–412, 60/712, 668; 123/198 F; 180/69.6, 302, 165

[56] References Cited

U.S. PATENT DOCUMENTS

| | | | |
|---|---|---|---|
| 2,544,606 | 3/1951 | Mallory | 180/302 |
| 3,958,900 | 5/1976 | Ueno | 60/712 X |
| 3,986,575 | 10/1976 | Eggman | 60/712 |
| 4,123,910 | 11/1978 | Ellison, Sr. | 60/412 X |
| 4,492,192 | 1/1985 | Baguelin | 60/712 X |

Primary Examiner—Allen M. Ostrager
Attorney, Agent, or Firm—David Pressman

[57] ABSTRACT

A vehicle kinetic energy reclaiming system employs the vehicle's engine (10) to compress air when the vehicle decelerates and reuses the stored compressed air to drive an air motor (78) which assists in powering the vehicle when it is underway again. When the vehicle begins to decelerate, an accelerator switch (24) causes a valve (38) in a carburetor (34) bypass pipe to open, allowing ample air to enter and be compressed by the engine, which is driven by the vehicle's kinetic energy through the transmission (42). This helps decelerate the vehicle and saves its brakes. The same switch closes a valve (22) in the exhaust line (18–19), causing the compressed air to be diverted to a storage tank (26). When enough pressure in accumulated in the tank, a pressure release valve (74) in the tanks' output opens and a valve switch (72) closes, allowing air to reach an accelerator-controlled valve (88). This enables a clutch (76), which connects the air motor to the vehicle's transmission, to be operated. When the vehicle is underway again, the accelerator switch causes the air motor clutch to engage, connecting the air motor to the transmission. Also a linkage (86) from the accelerator opens the accelerator-controlled valve, allowing air from the tank to reach the air motor. As a result the air motor is powered by the stored compressed air, thereby adding power to the vehicle and reclaiming the stored kinetic energy to save fuel.

20 Claims, 3 Drawing Sheets

ACCEL DOWN; PRESURE IN TANK--AIR MOTOR CONTRIB. POWER

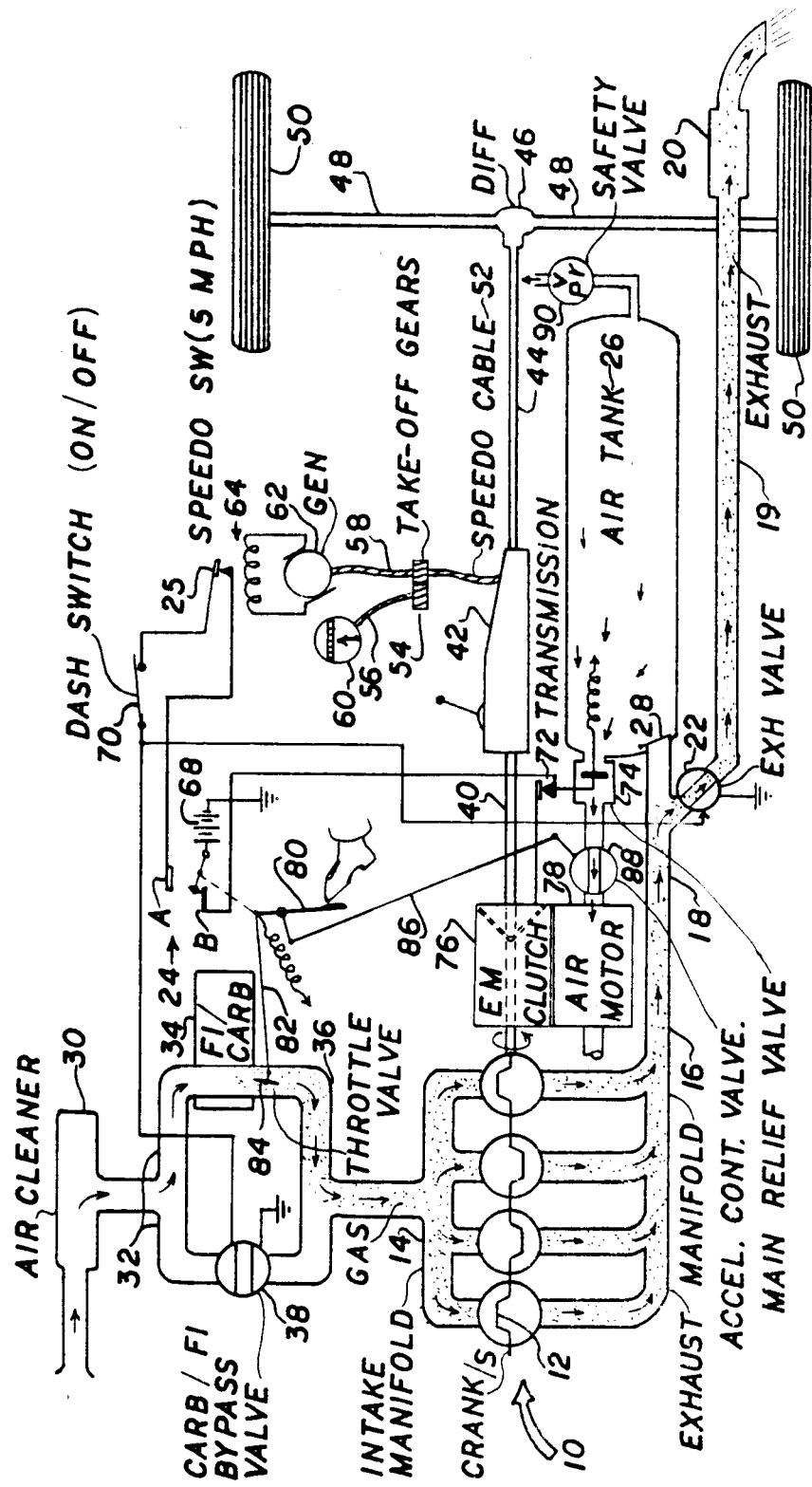
FIG 1— ACCEL DOWN; PRESURE IN TANK--AIR MOTOR CONTRIB. POWER

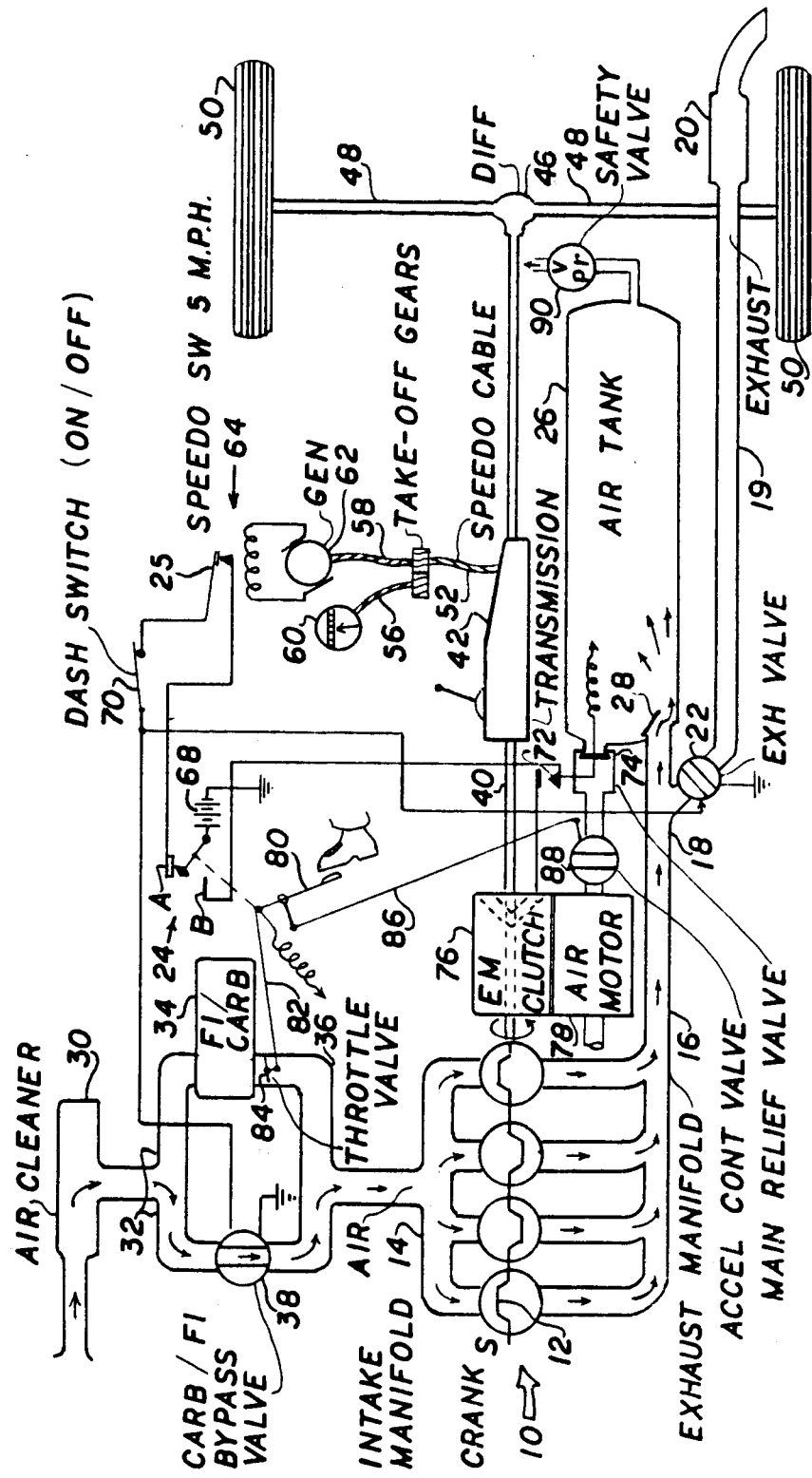
FIG 2 -- ACCEL. RELEASED, AUTO DECELLERATING

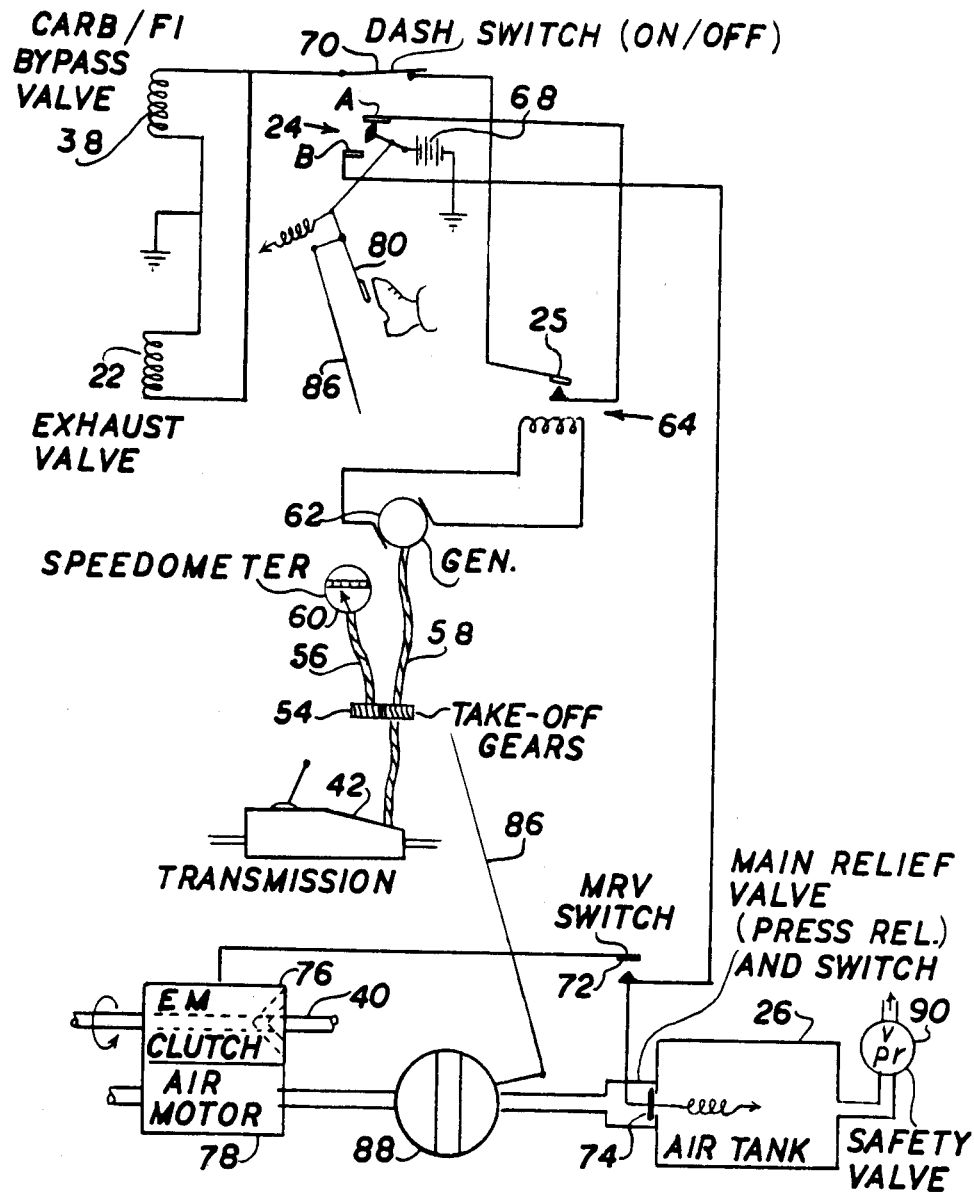
FIG 3 -- CIRCUITRY DURING DECELLERATION

KINETIC ENERGY RECLAIMING SYSTEM FOR VEHICLE

CROSS REFERENCE TO RELATED APPLICATION

This is a continuation-in-part of Ser. No. 06/940,092, filed Dec. 12, 1986, now abandoned.

BACKGROUND

1. Field Of Invention

This invention relates generally to motor vehicles, specifically to a system for reclaiming the kinetic energy which ordinarily would be wasted by a vehicle in braking or coasting.

2. Description Of Prior Art

Currently when a driver wants to slow or stop a motor vehicle from a moving condition, the driver either removes a foot from the gas pedal (accelerator) to let the vehicle coast to a stop or also applies the brakes if the driver wants the vehicle to stop or decelerate more rapidly. In either case the kinetic (moving) energy of the vehicle dissipates as heat, in friction of the wheel bearings, air, and engine, together with friction in the brakes if the driver applies the brake. Thus the kinetic energy accumulated by motion of the vehicle is wasted in heat. It would be desirable, in order to conserve fuel and hence natural resources, if such kinetic energy could be reclaimed for doing useful work.

Gardner, in U.S. Pat. No. 4,590,767 (1986) shows a kinetic energy reclaiming system where energy is recovered from the drive train parts of the vehicle to compress air which is used to propel the vehicle when it later moves underway. However this system is extremely complex, requires an auxiliary compressor, and does not use the engine itself for any reclaiming purpose.

Similarly Dyer, in U.S. Pat. No. 3,913,699 (1975) shows a system which uses regenerative braking to store energy in the form of compressed air, but again, the system is very complex, requires an auxiliary compressor, and does not use engine itself.

Also, Earle, in U.S. Pat. No. 4,361,204 (1982) shows a system where a separate compressor is used to store compressed air which is used to power an air motor. Again the auxiliary compressor makes for a complex, expensive system.

Carman, in U.S. Pat. No. 4,227,587 (1980) shows a kinetic energy reclaiming system where a hydraulic system is employed to transmit and reuse energy. The use of a hydraulic system is disadvantageous since it is subject to leaks and also is complex and requires auxiliary pumps, etc.

OBJECTS AND ADVANTAGES

Accordingly, several objects and advantages of the invention are to provide a vehicle kinetic energy reclaiming system which is relatively simple in construction, does not require pumps or compressors, is relatively light in weight, is relatively inexpensive, and does not require hydraulic components. Another object is to use the vehicle's engine in the recovery process and to provide multiple used for the engine. Additional objects are to save natural resources, including fossil fuels, to provide more efficient vehicles, to save wear on brakes, and to help any political entity become energy self-sufficient. Further objects and advantages will become apparent from a consideration of the ensuing description and the accompanying drawings.

SUMMARY

Briefly, a vehicle kinetic energy system in accordance with the invention operates by causing the kinetic motion of the vehicle during deceleration to turn (drive) the engine. The driven engine compresses air which is stored in a tank. This compressed air later helps power the vehicle when it is again underway by turning an air motor which is coupled to the vehicle's transmission.

DRAWING FIGURES

FIG. 1 is a diagram of a vehicle with an energy reclaiming system where the vehicle is underway using conventional and reclaimed power.

FIG. 2 is a diagram of such system where the vehicle is decelerating and storing energy.

FIG. 3 is a diagram of the electrical components of the system of FIG. 2.

DRAWING REFERENCE NUMERALS 10 engine
12 crankshaft
14 intake manifold
16 exhaust manifold
18 manifold pipe
20 muffler
22 exhaust valve
24 accelerator switch
25 generator relay (speedo) switch
26 air tank
28 flap valve
30 air cleaner
32 two-pipe manifold
34 carburetor or fuel injectors
36 carb. output pipe
38 carburetor bypass valve
40 transmission shaft
44 driveshaft
46 differential
48 rear axles
50 rear wheels
52 speedometer takeoff cable
54 takeoff gearbox
56 speedometer cable
58 gen. drive cable
62 electric generator
64 relay
68 battery
70 dashboard (on/off) switch
72 pressure release valve switch
74 pressure release valve
76 air motor clutch
78 air motor
80 accelerator
82 throttle linkage
84 throttle valve
86 accelerator valve linkage
88 accelerator-operated valve

DETAILED DESCRIPTION—FIG. 1

The kinetic energy reclaiming system of the invention is shown installed to cooperation with a conventional engine on a vehicle in FIG. 1.

A conventional four-cylinder engine 10 includes a crankshaft 12, an intake manifold (multiple pipe arrangement) 14, and an exhaust manifold 16. Exhaust manifold 16 feeds an manifold pipe 18. An electrically-controlled exhaust valve 22 is positioned in pipe 18. Valve 22 is normally open, allowing exhaust gases to flow therethrough to an exhaust pipe 19 and then to a muffler 20 and a tailpipe thereafter. However valve 22 closes upon application of a control voltage from section A of an accelerator switch 24 and a generator relay switch 25 (described infra). Upon closure of exhaust valve 22, air and any exhaust in pipe 18 is diverted into an air tank 26 via an inlet check (one-way) flap valve 28. Tank 26 preferably has a volume of about 100 to 200 liters; the larger tank 26 is, the more kinetic energy it can store and save. For trucks and other large vehicles, obviously far larger tanks can be carried.

Air is supplied to engine 10 from an air inlet of an air cleaner 30 which in turn supplies air to a two-pipe manifold 32. The right output of manifold 32 is connected to a conventional carburetor 34. Carburetor 34 is also suplied with fuel (gasoline or diesel oil—not shown) and feeds its output (a stoichometric fuel/air mixture) to pipe 36 which is connected to intake manifold 14 and thence to engine 10.

Air cleaner 30 also supplies air to the left output of manifold 32 which is connected to pipe 36 via a carburetor bypass valve 38. Valve 38 is normally closed so that all of the air from cleaner 30 goes to carburetor 34, but valve 38 opens upon application of a control voltage from section A of accelerator switch 24. Upon opening of carburetor bypass valve 38, air from cleaner 30 is fed directly to pipe 36 and thence to manifold 14 and engine 10.

If the vehicle uses fuel injectors (not shown) instead of a carburetor, bypass valve 38 would be replaced by a set of valves (not shown) which bypass the respective fuel injectors to allow air to enter the engine in lieu of the normal fuel and air mixture. Hereinafter when the carburetor bypass valve is referred to, fuel injector bypass valves are also included.

Crankshaft 12 of engine 10 is connected to a conventional flywheel (not shown) at the output (right) side of the engine and thence, via a transmission shaft 40, to a conventional transmission 42, which may be an automatic or manual transmission. Preferably transmission 42, if automatic, includes a torque converter lockup mechanism so that shaft 40 will be connected more directly to driveshaft 44 when the vehicle is underway or decellerating. The output of transmission 42 is connected, via a conventional driveshaft 44 and differential 46, to the rear axles 48 and rear wheels 50 of the vehicle. In lieu of the rear-drive arrangement shown, the vehicle may employ a front-wheel drive arrangement (not shown).

Most of the remaining components are provided in accordance with the invention and can be seen most clearly in FIGS. 1 and 3. A speedometer (speedo) take-off cable 52 is conventionally connected to from transmission 42 to a takeoff gearbox 54 which has two output cables, 56 and 58. Cable 56 is connected to a conventional speedometer 60 and cable 58 is connected to an electrical generator 62. Generator 62 is connected to the coil of a relay 64 which includes single-pole, single-throw switch 25. When the vehicle is in motion, cables 52, 56, and 58 will turn, causing generator 62 to provide an electrical output which operates relay 64 so that switch 25 will close, i.e., be rendered transmissive or "on" when the vehicle's speed is above about 8 kph (5 mph).

The vehicle's battery 68 has one side grounded and its other side connected to the arm of single-pole, double-throw (A/B) accelerator switch 24. The "A" side of switch 24 is connected to switch 25 of relay 64 and thence to a dashboard on/off switch 70. The output of dash switch 70 is supplied to exhaust valve 22 and carburetor bypass valve 38, described above.

The B side of switch 24 is connected to a main release valve (MRV) switch 72 of a main pressure release valve 74 from air tank 26. Switch 72 is then connected to an electromagnetic (EM) clutch 76 which connects an air motor 78 to transmission shaft 40. Air motor 78 may be a high-efficiency turbine or a piston-driven motor. Its EM clutch 76 may be a solenoid-driven mechanical clutch connected to shaft 40 by gears, or a magnetically-controlled iron-particle clutch.

Switch 24 is operated from accelerator pedal 80. When pedal 80 is depressed as shown (FIG. 1), the arm of switch 24 is connected to side "B" and when pedal 80 is released (FIG. 2) the arm of switch 24 is connected to side "A".

As shown in FIG. 1, a mechanical linkage 82 from accelerator 80 is connected to a conventional butterfly valve or throttle 84 which is part of carburetor 34. A mechanical linkage 86 from accelerator 80 is connected to a mechanically operated or lever-operated accelerator-controlled valve 88 which is operably situated between main pressure release valve 74 and air motor 78. When accelerator 80 is depressed, linkage 86 will open valve 88, thus allowing air from valve 74 to reach motor 78.

Air tank 26 includes a safety pressure release valve 90 which is set to open and release the pressure in tank 26 when the pressure gets too high, say about 20 atmospheres. Main valve 74 is set to open and thus release air at an suitable operating pressure for air motor 78, say 5-6 atmospheres. When valve 74 opens, main release valve switch 72 will close or be rendered transmissive ("on"), allowing potential, if present on the "B" output of switch 24 to be applied to clutch 76. When clutch 76 is energized, air motor 78 will be coupled to shaft 40.

Engine 10 can be a gasoline or diesel engine. The latter is preferred because it will build up more pressure when mechanically driven by the vehicle's kinetic (coasting) energy. Also it can be a Wankel or rotary type engine, a turbine engine, or any other engine which, when driven by the vehicle's coasting motion, will act as an air compressor.

OPERATION—VEHICLE FIRST UNDERWAY—FIG. 1

When the vehicle first starts out from an off condition, the pressure in air tank 26 (FIG. 1) will be nil, i.e., equal to atmospheric pressure. Dash switch 70 is turned on to permit the kinetic energy recovery system to work. Engine 10 is started, causing atmospheric air to enter air cleaner 30. The air will then travel via pipe 32 to carburetor 34 where it will be mixed with fuel and sent via pipe 36 and manifold 14 to engine 10 where the fuel and air mixture is burned to produce power. Transmission shaft 40 turns, as does driveshaft 44 and axles 48 and wheels 50, causing the vehicle to proceed.

The vehicle's exhaust is sent out through exhaust manifold 16, pipe 18, and, via open valve 22, to exhaust pipe 19, muffler 20, and the tailpipe. The exhaust does not enter air tank 26 since it is easier for it to flow out the patent exhaust path pipe via valve 22 and pipe 19, than to overcome the resistance of check valve 28.

FIG. 1 actually illustrates the conditions in the vehicle's system at a later stage, when the vehicle is being powered by air motor 78. However the only difference between this later stage and the current condition is that as yet there is no pressure in tank 26, valve 74 is closed, its switch 72 is open, air motor 78 does not turn, its clutch 76 is disengaged, and no air flows from tank 26 to air motor 78.

Throttle valve 84 is open, allowing the fuel and air mixture to flow into the engine from carburetor 34. Since no pressure has been accumulated in tank 26, pressure or main relief valve 74 is closed as shown in FIG. 3, MRV switch 72 is open (nontransmissive), and clutch 76 of air motor 78 is disengaged; thus shaft 40 will not turn air motor 78. Since accelerator pedal 80 is depressed, switch 24 is in the "B" position, i.e., output "B" thereof is energized and output "A" thereof is at ground potential. However the potential on the "B" output of switch 72 will not have any effect since MRV switch 72 is open, as stated. Speedo cable 52, and hence cable 58 and generator 62 will rotate, causing relay 64 to close speedo switch 25, but this will have no effect since the "A" output of accelerator switch 24 has no potential, as stated.

In this condition, the kinetic energy recovery components have no effect and the vehicle operates conventionally.

OPERATION—VEHICLE DECELLERATES—FIG. 2

The first time the vehicle decellerates, e.g., to stop for a traffic light or pick up passengers, the pressure in air tank 26 (FIG. 2) will still be equal to atmospheric pressure. The kinetic energy or motion of the vehicle will cause it to continue to move forward so that wheels 50 (FIG. 2) will continue to turn. Their motion will be coupled to axles 48, driveshaft 44, transmission 42, transmission shaft 40, and engine 10, whereby the engine will continue to turn, albeit due to the vehicle's kinetic energy, rather than due to its own power.

Since the driver's foot is off pedal 80, only enough fuel and air mixture to sustain an idle will be delivered by carburetor 34. The "A" output of switch 24 will be energized. Since speedo switch 64 continues to remain closed due to rotation of generator 62, and since dash switch 70 continues to be energized, carburetor bypass valve 38 will be energized, causing this valve to be opened, allowing the normal vacuum of turning engine 10 to draw air in through valve 38. The turning engine will compress this air and force it out (along with some exhaust) through exhaust manifold 16 and into manifold pipe 18.

Since the "A" output of switch 24 is energized, and since switches 64 and 70 are closed, exhaust valve 22 will be energized, causing it to close and block exhaust pipe 19. As a result the compressed air in pipe 18 will take the path through check valve 28 into air tank 26 where it will build up pressure.

Assuming enough decelerations of enough duration have occurred, the pressure in tank 26 will eventually build up to a substantial value, e.g., to 13 atmospheres. When the pressure builds up to a value sufficient to operate air motor 78, say 5-6 atmospheres, main relief valve 74 will open, closing MRV switch 72. However clutch 76 will not be engaged since the "B" output of switch 24 is not energized. The air pressure will not reach air motor 78 since lever-operated valve 88 is closed when the accelerator pedal is up.

When the vehicle slows to about 8 kph, generator 62 will no longer rotate fast enough to generate enough voltage to operate relay 64. Thus relay switch 25 will open. This will cause valves 22 and 38 to open and close, respectively. The closure of valve 38 will stop the flow of air to the engine and allow only the idle fuel and air mixture to enter the engine. The opening of valve 22 will allow the exhaust to flow out the exhaust pipe in a conventional manner.

If the vehicle is driven again before enough pressure is accumulated in tank 26 to open main relief valve 74, the same conditions as described in the preceeding section (Vehicle First Underway) will exist, except that tank 26 will be slightly pressurized.

OPERATION—VEHICLE UNDERWAY WITH FULL PRESSURE IN TANK—FIG. 1

When the vehicle is driven again after enough pressure is accumulated in tank 26 (FIG. 1) to open main relief valve 74, the same conditions as described in the first operation section (Vehicle First Underway) will exist, except that tank 26 will be fully pressurized and air motor 78 will rotate, helping to power the vehicle.

Specifically, valve 74 will be opened by the pressure in tank 26, which will also open MRV switch 72. Since the "B" output of switch 24 is energized, clutch 76 will be energized, mechanically coupling the air motor of transmission shaft 40. Since accelerator 80 is now down, valve 74 will be opened, allowing air from tank 26 to proceed to the air motor. As a result, the air motor will turn, adding power to the power already supplied to shaft 40 by the engine.

The power contributed by the air motor will enable the vehicle to proceed with less fuel consumption than if the air motor were not used. Thus the vehicle's kinetic energy, which would normally be wasted in friction in slowing down the vehicle, has been saved as compressed air and is now being recycled to power the vehicle and save fuel when it resumes forward motion under engine power.

In addition, the storage of the vehicle's kinetic energy will save the vehicle's brakes since the use of the engine as a compressor to convert the vehicle's kinetic energy to compressed air will exert a drag on the vehicle and slow it down faster than it normally would slow down if it coasted.

When the pressure in tank 26 drops to a value lower than that required to keep valve 74 open, i.e., a pressure lower than that required to turn air motor 78, valve 74 will close, cutting off air to the air motor, and its switch 72 will open, disengaging clutch 76. Thus the kinetic energy reclaiming system will be disconnected and the vehicle will proceed entirely under fuel power. Without valve 74, the air pressure in tank 26 would be dissipated through the air motor without doing any work.

I have calculated that under theoretically ideal conditions, the reclaiming system can store enough energy to bring a vehicle back up to 70% of its original speed, assuming the air motor alone is used to power the vehicle after it has coasted to a stop from its original speed.

To disconnect the system, the driver merely opens dash switch 70; this will prevent carburetor bypass valve 38 from opening, and exhaust valve 22 from closing, so that no pressure will be accumulated in tank 26.

SUMMARY, RAMIFICATIONS, AND SCOPE

Accordingly it is seen that, according to the invention, I provide a vehicle energy reclaiming system which is relatively simple in construction, does not require pumps or compressors, is relatively light in weight, is relatively inexpensive, and does not require hydraulic components. It uses the vehicle's engine as a compressor in the kinetic energy recovery process. Moreover it saves wear on the vehicle's brakes, in addition to saving fuel.

While the above description contains many specificities, these should not be construed as limitations on the scope of the invention, but as exemplifications of the presently-preferred embodiments thereof. Many other ramifications and variations are possible within the teachings of the invention. For example, the system can be controlled by a microprocessor connected to sensors or a hydraulic system. The system can be used on any vehicle, such as automobiles, trains, trucks, elevators, and boats. The air motor clutch can be eliminated, at some loss of efficiency. All of the controls can be manually operated, instead of the automatically-operating means shown. Thus the scope of the invention should be determined by the appended claims and their legal equivalents, and not by the examples given.

I claim:

1. A vehicle energy recovery system, comprising:
   a vehicle having an engine which can convert a source of fuel to mechanical energy to drive said vehicle and which can compress a gas supplied to said engine if said engine is turned by the kinetic energy of said vehicle when said vehicle is coasting, said engine having an output pipe for conducting exhaust gas from said engine when it runs on said fuel and for conducting said compressed gas from said engine when it is turned by the kinetic energy of said vehicle,
   a transmission arranged to connect a mechanical output of said engine to a drivetrain of said vehicle for driving said vehicle when said engine receives and is powered by said fuel, and for connecting said vehicle to said engine such that kinetic energy from movement of said vehicle can be coupled to said engine so as to cause said engine to turn and compress said gas supplied thereto when said vehicle is coasting,
   a tank for receiving the compressed gas supplied by said engine,
   exhaust valve means for selectively connecting said output pipe of said engine to either an exhaust outlet or to said tank,
   a motor which can be run by said compressed gas,
   connection means for connecting a mechanical output of said motor to power said vehicle,
   tank valve means for selectively supplying said compressed gas from said tank to said motor, and
   control means for causing said exhaust valve means to connect said output pipe of said engine to said tank when said vehicle is moving under its own momentum, whereby the kinetic energy of said vehicle will be stored as compressed gas for later use in powering said vehicle and thereby saving fuel.

2. The system of claim 1, further including fuel and air mixing means for supplying a fuel and air mixture to said engine and bypass means for selectively bypassing said mixing means and supplying said gas to said engine for compression.

3. The system of claim 2 wherein said vehicle includes an accelerator and a switch connected to be operated in accordance with the position of said accelerator, said switch being connected to actuate said bypass means so as to selectively bypass said mixing means when said accelerator is not operated.

4. The system of claim 3 wherein said connection means for connecting a mechanical output of said motor to power said vehicle comprises clutch and said switch is also arranged to actuate said clutch when said accelerator is operated.

5. The system of claim 4, further including sensor means for preventing said switch form operating said clutch unless the pressure in said tank has accumulated to a predetermined value.

6. The system of claim 1 wherein said tank includes an inlet check valve for receiving said compressed gas from said engine.

7. The system of claim 1 wherein said vehicle includes an accelerator for controlling the supply of fuel to said engine and wherein said exhaust valve means for selectively connecting said output pipe of said engine to either an exhaust outlet or to said tank comprises a valve and wherein said control means is responsive to the position of said accelerator.

8. The system of claim 1, further including a clutch for selectively coupling the mechanical output of said motor to said drivetrain of said vehicle.

9. The system of claim 8 wherein said control means is arranged to engage said clutch in response to the position of said accelerator.

10. The system of claim 1 wherein said tank valve means for selectively supplying said compressed gas from said tank to said motor comprises a pressure relief valve at the output of said tank.

11. The system of claim 10, further including pressure sensing means for allowing said clutch to be engaged in response to the state of said pressure relief valve at the output of said tank.

12. A vehicle energy recovery system, comprising:
   a vehicle having an internal combustion engine which can convert a source of fuel to mechanical energy to drive said vehicle and which can compress air supplied to said engine if said engine is turned by the kinetic energy of said vehicle when said vehicle is coasting, said engine having an exhaust pipe for conducting exhaust gas from said engine when it runs on said fuel and for conducting said compressed air from said engine when it is turned by the kinetic energy of said vehicle,
   a transmission arranged to connect a mechanical output of said engine to a drivetrain of said vehicle for driving said vehicle when said engine receives and is powered by said fuel, and for connecting said vehicle to said engine such that kinetic energy from movement of said vehicle can be coupled to said engine so as to cause said engine to compress said air supplied thereto when said vehicle is coasting,
   a tank for receiving the compressed air supplied by said engine, said tank having a check valve at its input,
   control means for connecting said exhaust pipe of said engine to an exhaust outlet in response to said vehicle being underway or to said tank in response to said vehicle coasting,
   an air motor which can be run by said compressed air,
   connection means for connecting a mechanical output of said air motor to power said vehicle, and
   pressure sensing means for supplying said compressed air from said tank to said motor when said vehicle is underway if a predetermined pressure has accumulated in said tank.

13. The system of claim 12, further including fuel and air mixing means for supplying a fuel and air mixture to said engine and means for bypassing said mixing means and supplying said gas to said engine for compression when said vehicle is coasting.

14. The system of claim 13 wherein said vehicle includes an accelerator and a switch connected to be operated in accordance with the position of said accelerator, said switch being connected to actuate said means for selectively bypassing said mixing means when said accelerator is not operated.

15. The system of claim 14 wherein said connection means for connecting a mechanical output of said motor to power said vehicle comprises a clutch means and said switch is also arranged to actuate said clutch when said accelerator is operated.

16. The system of claim 15, further including sensor means for preventing said switch from operating said clutch unless the pressure in said tank has accumulated to a predetermined value.

17. The system of claim 12 wherein said vehicle includes an accelerator for controlling the supply of fuel to said engine and wherein said connection means for selectively connecting said output pipe of said engine to either an exhaust outlet or to said tank comprises a valve responsive to the position of said accelerator.

18. The system of claim 12, further including a clutch for selectively coupling the mechanical output of said motor to said drivetrain of said vehicle.

19. The system of claim 18, further including clutch control
means for engaging said clutch in response to the position of said accelerator.

20. A method of recovering and reusing the kinetic energy of a vehicle, comprising:
providing a vehicle having (a) an engine which can convert fuel energy to move said vehicle and which can compress gas if said engine is mechanically rotated, (b) a tank for storing compressed air, (c) an gas motor which can convert energy from compressed gas to mechanical energy to assist in moving said vehicle, and (d) a transmission which can couple mechanical energy from said engine to the wheels of said vehicle to move said vehicle and which can couple mechanical energy from the wheels of said vehicle to rotate said engine so that said engine will compress said gas when said vehicle is coasting,
causing said transmission to couple mechanical energy from the wheels of said vehicle to rotate said engine and thereby compress said gas so as to convert the kinetic energy of said coasting vehicle to compressed gas energy,
causing the gas compressed by said engine to be stored in said tank when said vehicle is coasting,
when said vehicle is underway again and said engine is converting said fuel energy to mechanical energy to move said vehicle, causing the gas stored in said tank to rotate said gas motor,
coupling a mechanical output of said gas motor to said transmission so as to assist said engine and reuse the stored kinetic energy of said coasting vehicle to save fuel when said vehicle is again underway.

* * * * *